Feb. 15, 1949.  C. C. COONS  2,461,722
HANGER DEVICE FOR AUTOMOBILE WINDOWS
Filed Aug. 9, 1946   3 Sheets-Sheet 1

INVENTOR.
Curtis C. Coons
BY

Feb. 15, 1949.  C. C. COONS  2,461,722
HANGER DEVICE FOR AUTOMOBILE WINDOWS
Filed Aug. 9, 1946  3 Sheets-Sheet 3
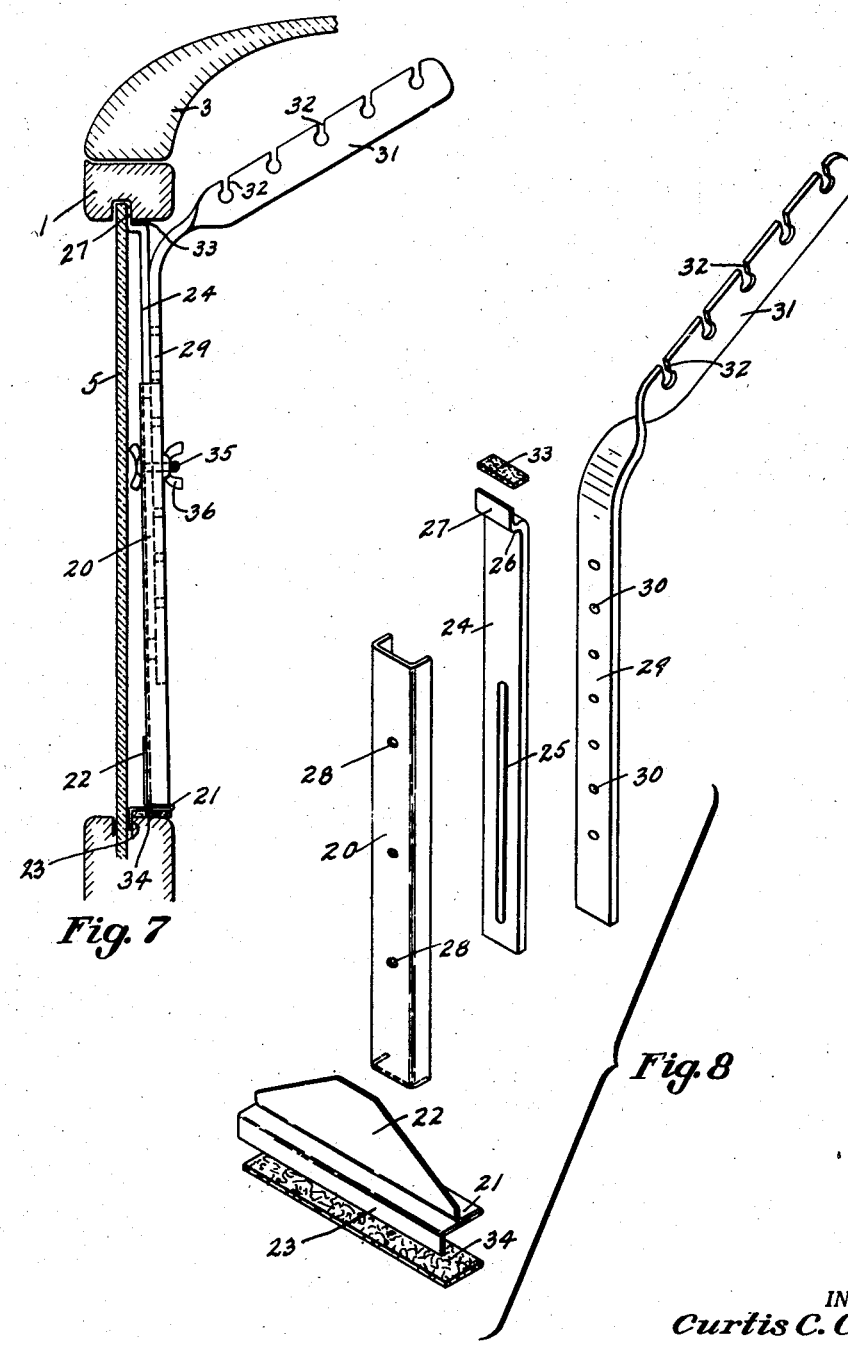
INVENTOR.
*Curtis C. Coons*

Patented Feb. 15, 1949

2,461,722

UNITED STATES PATENT OFFICE 2,461,722

HANGER DEVICE FOR AUTOMOBILE WINDOWS

Curtis C. Coons, North Canton, Ohio

Application August 9, 1946, Serial No. 689,631

4 Claims. (Cl. 224—29)

The purpose of my present invention has been to produce a new and improved type of garment hanger, or bracket mounting, designed primarily for automobile use for supporting garments depending therefrom in a compartment of the car adjacent to one of the usual outswinging doors.

It has been proposed, heretofore, to employ a small bracket member attachable to a window pane by means of a suction cup for the objective above noted. Such devices serve only to accommodate a few articles of apparel, however, and sometimes become loosened from the window to which they are attached, an obvious disadvantage. Also they do not carry garments sufficiently high to keep them off the floor of the car.

I aim by the employment of my present invention to obviate the difficulties incident to the use of such prior devices as are known to me, by utilizing mechanical attaching or interlocking means for holding my hanger or bracket in position on the frame of the door window, including an extensible and adjustable support on which the hanger arm is carried.

In addition to the foregoing a further object of my invention is to supply a device of the class referred to which may be quickly attached or detached relatively to the window frame or door structure of an automobile, and which will in no way mar or injure the finish of the same.

Another object of my invention has been to so design my garment hanger that it may be mounted in attached relation to window frame portions of auto doors, which may be of different sizes as found in divers models of automobiles today.

Still a further object of my new device is to utilize structural features by which the garment hanger unit is maintained rigidly in place by the support means, once it is mounted in position on the window frame; wherein the bracket or garment supporting arm may project above the top of the door to afford higher supporting advantage for garments than heretofore achieved, and wherein the said arm is stabilized against swinging once the unit is properly mounted in position on the frame parts by which it will be supported.

Other objectives attained in my construction of hanger are the making of my device so that it may be collapsed readily for packing away when not to be used, the employment of parts readily to be assembled when desired to use the device, and the construction of such parts in such a manner that they may be manufactured cheaply so that my unit may be sold at a relatively low price to the public.

Another advantage of my invention lies in using a construction of unit, which when mounted in the window of the automobile door will in no way interfere with the opening and closing of the window by customary operation, without affecting the position of the garments supported by my unit independently of the movable window pane itself.

Other objects of my improved hanger unit will appear more fully upon referring to the followed detailed description of the construction availed of, in conjunction with the accompanying drawings, and in the latter.

Figure 7 is a view somewhat similar to Figure 2 but showing a modified construction of my invention.

Figure 8 is a view similar to Figure 6 but illustrating said modification.

Figure 1:
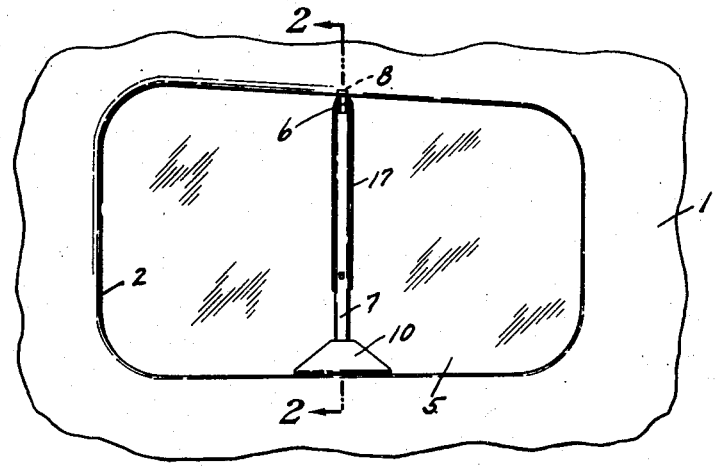
Figure 1 is a view in elevation showing a portion of an automobile door with its window, and additionally illustrating the manner of mounting my garment hanging unit therein.

Certain preferred embodiments of my invention are illustrated in the drawings, and I shall first describe the construction depicted in Figures 1 to 6 of the drawings.

Figure 2:
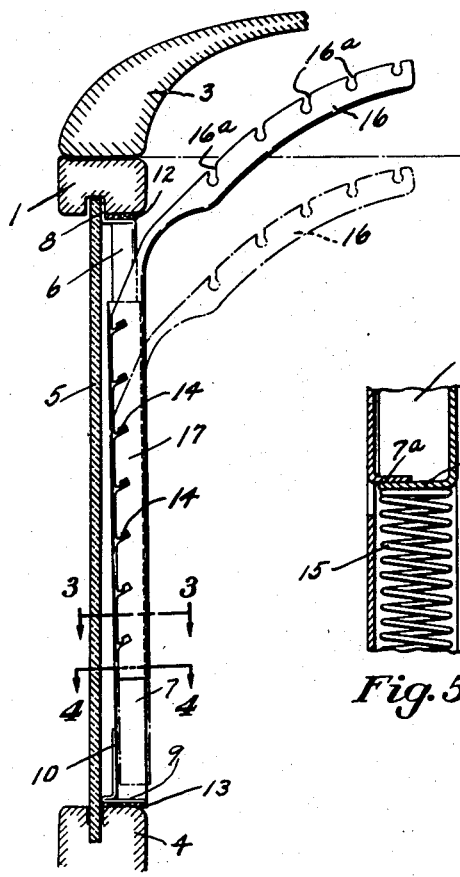
Figure 2 is a vertical sectional view showing a portion of the automobile door and top of the vehicle, my garment hanger being mounted in operative position with the hanger arm adjacent to said top.
Figure 3:
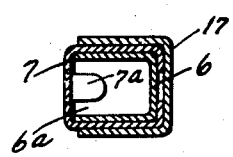
Figure 3 is a horizontal sectional view on the line 3—3 of Figure 2.
Figure 4:
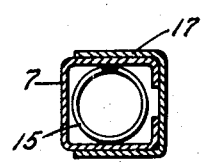
Figure 4 is a horizontal sectional view on the line 4—4 of Figure 2.
Figure 5:
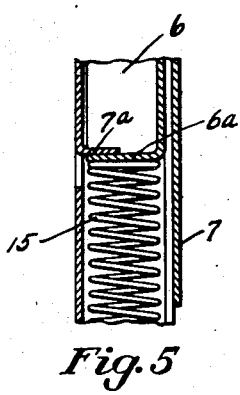
Figure 5 is a fragmentary vertical sectional view showing more clearly the coaction of the spring intermediate the upper and lower members of my support for the garment hanging arm.
Figure 6:
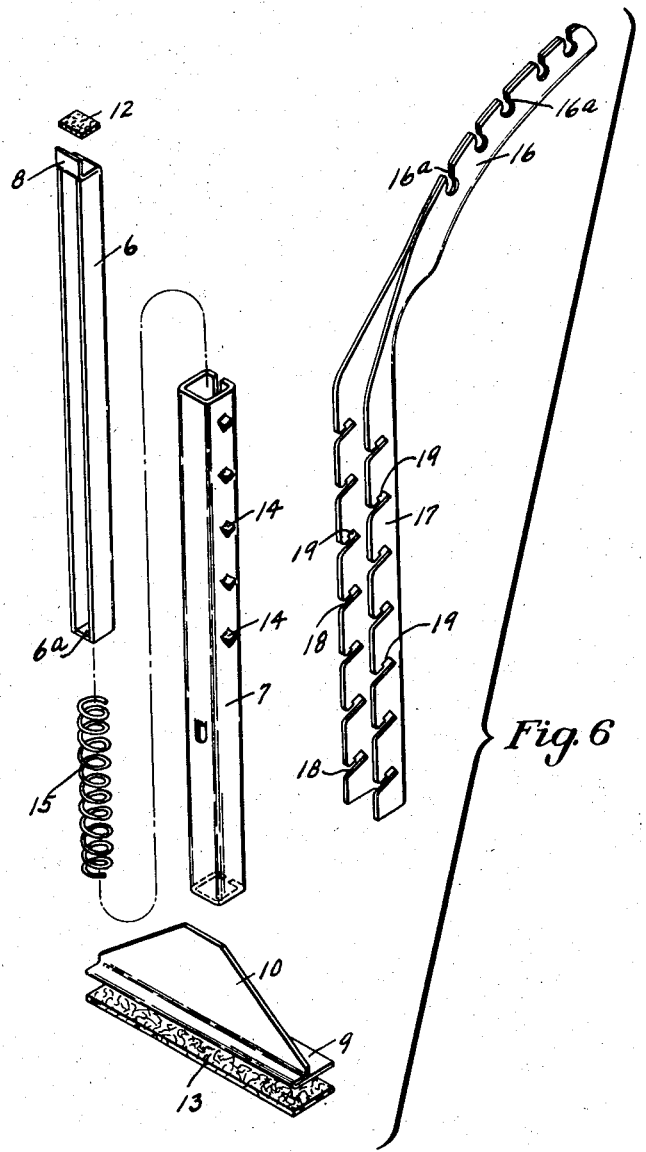
Figure 6 is a combination view showing the various parts of my hanger device in perspective and separated from each other.

In Figure 1 there is shown in fragmentary view the upper portion of an automobile door 1, with my hanger or bracket unit disposed in operative position at the window opening 2, spanning said opening vertically thereof and rigidly interlocked with the upper groove of the frame and in engagement with the sill portion of the window opening. Figure 2 shows the upper section of the door 1, 3 designates the top of the car, and 4 the sill of the window. The window glass sash or pane 5 is movable vertically in the door frame as usual, and can be lowered more or less into the hollow space of the door in the customary manner.

My unit is extensible and is made up of the adjustable and extensible support comprising the upper U-section or member 6 which is received in the complementary lower tubular member 7 in a slidable and telescopic manner. The upper member 6 has the vertical projection 8 to engage in the upper groove of the window frame 3, and the member 7 has a transverse base or stabilizing plate 9 welded or otherwise attached thereto at its lower end. The plate 9 is formed with a vertical bracing wing 10 welded to the side of the lower member 7, and is adapted to seat on the sill 4. At its lower end the member 6 has a bottom plate 6a, and I contemplate applying an anti-marring felt or pad 12 to the bearing upper end of the member 6, and a similar part 13 to the under surface of the flange 10, by means of an adhesive or any mechanical attaching means, adhesive being preferably employed.

The lower tubular member 7 of my extensible support is formed with struck out projections 14 extending laterally from each side. The supporting parts 6 and 7 are assembled after a coiled expansion spring 15 has been inserted in the member 7, so that its lower end rests on the base plate 9 closing said lower end. The upper member 6 is then inserted in the tubular member 7 and pushed downwardly against the upper end of the spring 15 after which a projection 7a on the closed side of the member 7 is struck in to a horizontal position to overlie the bottom member 6a of the member 6 and thus prevent separation of the two members 6 and 7. But the members 6 and 7 are movable longitudinally relatively to each other owing to the provision of the spring 15, the latter tending to push the member 6 upwardly in the member 7 so that when the base plate 9 rests on the sill 4 of the window, the spring 15 will maintain the member 6 uppressed to engage the projection 8 thereof in the groove at the upper side of the window opening 2.

My garment supporting means includes a supporting arm 16 having a shank which is of U-form with its sides spaced and provided with inclined slots 18, leading from the outer edges of said sides. At their inner terminals the slots 18 have locking notches 19. The spaced sides of the shank 17 are brought together at the upper end of the shank and bent outwardly to provide the arm 16 beforementioned, which is equipped with a plurality of slots 16a to receive the hooks of garment hangers on which garments are draped or supported.

The manner of use of my above described construction of unit is as follows. With the parts 6 and 7 of the support assembled said support is positioned with the plate 9 on the sill 4. The upper member 6 is then pressed downwardly against the expansion action of the spring 15 until the projection 8 is entered into the top groove of the window opening 2, whereupon the spring will hold the parts 6 and 7 engaged with the respective portions of the window with which they abut.

Next I mount the garment hanging arm 16 in place on the support by moving the shank 17 to a position in which the lower supporting member 7 is received between the sides of the shank and the projections 14 are engaged with the locking notches 19 by sliding up the slots 18. The foregoing mounting affords a rigid support for the arm 16, with its shank interlocked with a series of the projections 14 of the member 7.

The height to which the arm 16 is adjusted may be varied if long garments such as dresses are being carried by the arm 16. Adjustment to a high position such as shown in Figure 2 may be desirable or to a lower position indicated in dotted lines, dependent upon the requirements of use. The tendency of the weight of the garments on the arm 16 is to force the base plate 9 outwardly against the pane 5 of the window and thus prevent displacement of the hanger device. Preferably the window pane 5 should not be lowered to the level of the sill 4, having in view the foregoing cooperation of the parts 7 and 5.

I now pass to the description of another preferred form of my invention as it is shown in Figures 7 and 8 of the drawings.

In this modified form I contemplate the use, as much as practicable, of metal channel, plate or flat members for the support, and the hanger member or arm. To this end I utilize a support composed of a lower channel member or plate 20, the same equipped with the base plate 21 folded on itself to provide the upstanding wing or brace member 22 like the member 10 of my first described construction, and the depending engaging flange 23. This base plate 22 is secured, as by soldering or welding, to the lower end and side of the channel member 20.

The upper member 24 of the support is a simple plate adapted to be received between the edge flanges of the member 20, and having the longitudinal slot 25. At its upper end the member 24 is bent laterally, as at 26, and thence upwardly to provide the projection 27 to interlock in the upper groove of the window opening. The member 20 is provided with a series of openings 28 at intervals in its length.

My hanger means in this construction comprises a shank plate 29 having a series of vertically spaced openings 30 in the length thereof to register with the slot 25 and openings 28, and having its upper end twisted and bent so as to provide the offstanding hanger arm 31 equipped with notches 32 in its upper edge to receive the hooks of usual coat, dress or garment hangers.

On the upper surface of the flange 26 of the upper supporting member 24 I provide a felt pad 33 and on the under portion of the base plate 21 I provide a similar pad 34, for anti-marring purposes and similar to those previously described in regard to my first described construction of my invention. It is noted that if desired a band of rubber or like material may be passed around the parts 26 and 21 in lieu of the felts or pads 33 and 34, as a desirable modification of these features of my construction.

In assembling the parts of my construction of Figures 7 and 8 it will be apparent that the upper supporting member 24 is emplaced between the flanges of the lower supporting member 20, and the shank or plate 29 of the hanger member is similarly emplaced at the inner side of the member 24, so that both the parts 24 and 29 are between the edge flanges on the lower supporting member 20, whereupon the several parts 20, 24 and 29 are connected together by a small wing bolt 35 and tightened up by the wing nut 36 in an obvious manner. The bolt 35 may be passed through any one of the openings 28 and 30 of the parts 20 and 29, respectively and will pass through the slot 25. By suitable adjustment of the parts 20 and 24 they may be properly engaged in the window openings mounted in the vertical position such as generally shown in Figure 1 of the drawings, and the hanger arm 31 may be adjusted vertically to the proper height by reason of the passage of the bolt 35 through a selected one of the openings 30.

In the use of my invention of the construction last described the mounting of the support for the hanger member is very rigid in the frame of the window, there is no liability of detachment of the device from the window of the door of the automobile, and a large number of garments may be hung from the hanger arm 31 in an obvious manner. Also since the last mentioned construction is made of simple plate parts, it is obvious that it may be manufactured at a relatively low cost, and can therefore be vended at a most reasonable price to the public.

Because of the inclination of the hanger arms of my construction set forth, they may be adjusted to a height even above the door opening of the door window frame upon which the devices are mounted, thus to support relatively long garments or wearing apparel. Also my device in no way interferes with the opening and closing of the window glass to whatever extent desired.

Having thus described my invention, what I claim as new and desire to secure by Letters Patent of the United States is:

1. A garment hanging device for supporting garments from the frame of an automobile window, comprising a support comprising vertical upper and lower telescoping slidable members, the upper end of the upper member having a projection to enter the top sash slot of the window frame to interlock the upper end of the device therewith, the lower member having a sill base plate at its lower end to rest on the sill of a window opening and formed with a downward flange to enter the lower sash slot at such opening for interlocking the lower end of the device therewith, a connecting member connecting said upper and lower members for holding the same in adjusted positions to maintain the projection and flange parts interlocked with the window frame, and a garment hanger arm carried by the support and projecting laterally therefrom at a point adjacent the projection on the upper vertical member.

2. The garment hanging device claimed in claim 1, in which the hanger arm is detachably connected to the support and inwardly offstanding therefrom.

3. The garment hanging device claimed in claim 1, in which the said connecting member cooperates with said hanger arm for vertical adjustment of the latter relative to said support.

4. A garment hanging device as claimed in claim 1, in which the lower member of the support is a channel plate receiving between the flanged portions thereof the upper member, and in which the hanger arm has a shank extension received between the flanges of said channel plate, said connecting member also connecting the hanger arm shank with said support.

CURTIS C. COONS.

REFERENCES CITED

The following references are of record in the file of this patent:

UNITED STATES PATENTS

| Number | Name | Date |
| --- | --- | --- |
| 1,954,590 | Hanson | Apr. 10, 1934 |
| 2,157,001 | Morley | May 2, 1939 |
| 2,253,423 | Fellers et al. | Aug. 19, 1941 |
| 2,269,738 | Rybicky | Jan. 13, 1942 |
| 2,270,796 | Hauser | Jan. 20, 1942 |
| 2,316,389 | Atkinson | Apr. 13, 1943 |
| 2,344,339 | Zwald | Mar. 14, 1944 |
| 2,405,701 | Lange | Aug. 13, 1946 |